US005978199A

United States Patent [19]

Germann et al.

[11] Patent Number: 5,978,199

[45] Date of Patent: Nov. 2, 1999

[54] EMP-CHARGE-ELIMINATOR

[75] Inventors: Ivo Germann, St. Gallen; Daniel Meyer, Herisau, both of Switzerland

[73] Assignee: Huber & Suhner AG, Herisau, Switzerland

[21] Appl. No.: 09/010,649

[22] Filed: Jan. 22, 1998

[30] Foreign Application Priority Data

Jan. 27, 1997 [CH] Switzerland ............................ 0158/97

[51] Int. Cl.[6] ...................................................... H02H 1/00

[52] U.S. Cl. ........................... 361/119; 333/225; 333/207

[58] Field of Search ............................... 361/56, 91, 107, 361/108, 110–113, 119, 120; 439/578, 916; 333/111, 123, 160, 195, 199, 206, 207, 81 A, 222, 223, 225, 227, 231; 343/701

[56] References Cited

U.S. PATENT DOCUMENTS

| | | | |
|---|---|---|---|
| 2,392,664 | 1/1946 | Gurewitsch | 178/44 |
| 3,289,117 | 11/1966 | Kearns et al. | 333/73 |
| 4,292,610 | 9/1981 | Makimoto et al. | 333/222 |
| 4,544,984 | 10/1985 | Kawanami et al. | 361/119 |
| 5,764,114 | 6/1998 | Kühne | 333/12 |

FOREIGN PATENT DOCUMENTS

| | | | |
|---|---|---|---|
| 675933A5 | 7/1989 | Switzerland | H01T 4/06 |

*Primary Examiner*—Ronald W. Leja
*Attorney, Agent, or Firm*—Jay H. Maioli

[57] ABSTRACT

An EMP-eliminator is to be created which is simultaneously applicable for multiple frequency bands and highest frequencies and at the same time allows transmission of AC/DC supply voltages. For this purpose a casing (20) set in an outer line (10) is provided as well as a line (24) connected in an electrically conductive manner to an inner line of a coaxial line (30). The line (24) is connected in an electrically conductive manner with the equipment casing (20) or its face side via a gas filled overvoltage suppressor (28). The gas eliminator (28) is set into a threaded cover and thus can be exchanged. Between the equipment casing (20) and the line (24) several bushes (25,26) connected electrically to the line are provided. The length of the line (24) corresponds to the λ/4 length of the lowest transmitted frequency band. Several serially connected resonant cavities result which are matched in their length to different midband frequencies. With this kind of serially connected resonant cavities it is easily possible to transmit several frequency bands and thus protect end apparatuses from interference current impulses. The capacitance of the overvoltage suppressor (28) is decoupled by the line (24) and the bushes. (25,26) to such a degree that use up to 18 GHz is possible.

8 Claims, 2 Drawing Sheets

EMP-CHARGE-ELIMINATOR

Figure 1:
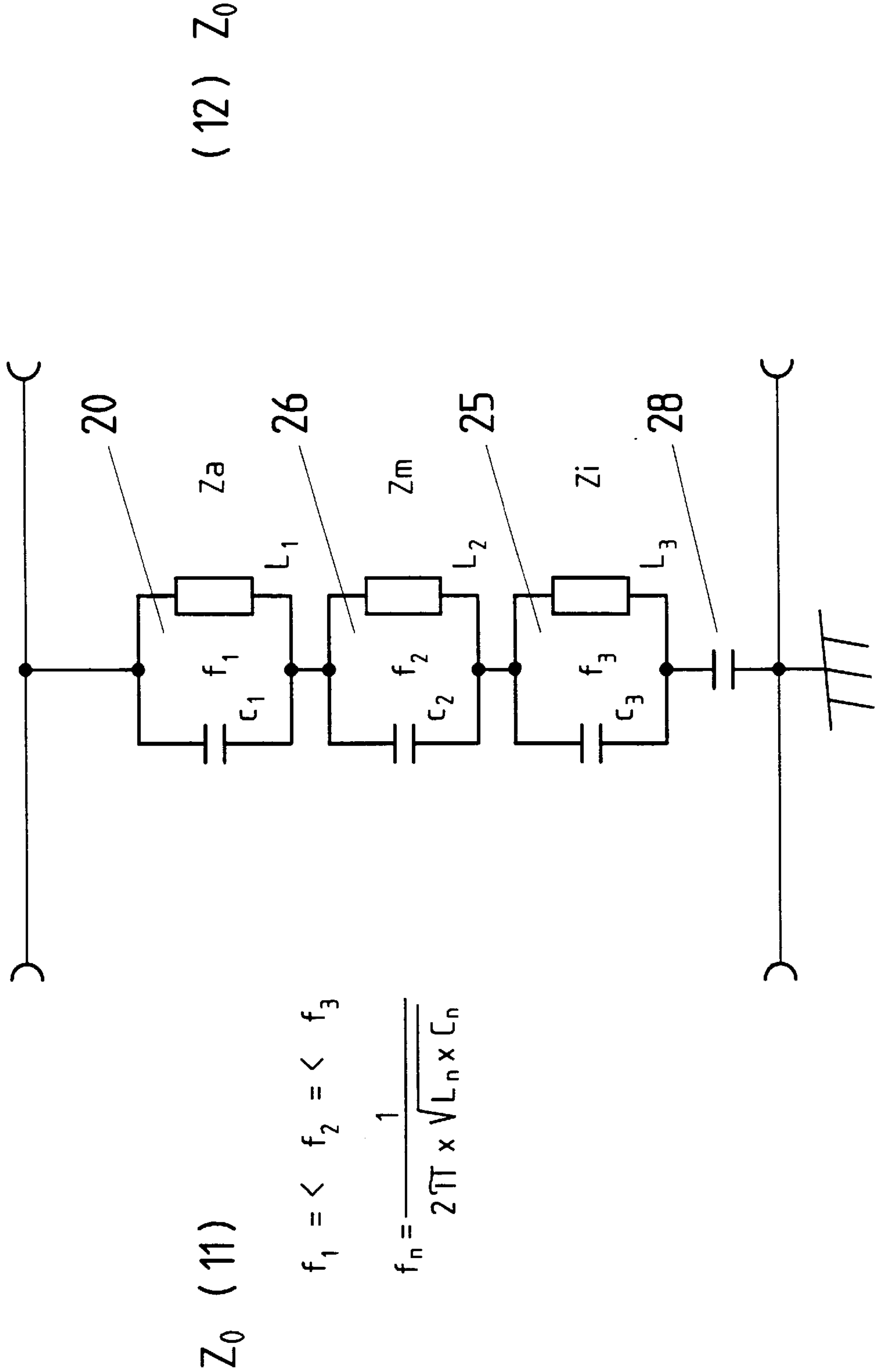

The present invention relates to an EMP-charge eliminator in a coaxial line consisting of a casing set in the outer line and a λ/4 short circuit line connected to the inner tine of the coaxial line in an electrically conductive manner.

Electromagnetic pulses (EMPs) of artificial type as can be produced by motors, switch-mode power supply units or the like as well as of natural provenance, as from direct or indirect lightning strikes, are guided by inductive, capacitive or galvanic coupling via coaxial lines into the connected devices and can damage or even destroy the latter. It is known to protect the devices against considerable overvoltages, interference voltages or lightning strike currents at their input by discharging or reflecting systems. E.g. high voltage suppressors known as λ/4 short-circuiting lines, also called λ/4 shorting stubs or EMP-filters with which these harmful currents and voltages at specific frequencies can be eliminated or reflected. This kind of arrangement is known from Swiss patents CH-676900, CH-660261 and from Swiss patent application 914/95.

Patent CH-676900 plans to eliminate or to reflect these currents and voltages by means of a λ/4 short-circuiting line connected between the inner and the outer line of the coaxial line. This λ/4 short-circuiting line, with its filter properties, acts as a frequency-selective filter for the fundamental resonance frequency and of its uneven harmonic. In patent CH-600261 an overvoltage suppressor filled with gas is presented which, in this circuit arrangement guarantees a good match up to a least 2 GHz. In application 914/95 the use in multiband systems by means of introducing resonant cavities in the casing and the coaxial line such that multiple special frequency bands are transmitted is described.

Known EMP-filters with λ/4 short circuiting lines have the disadvantage of not being able to transmit AC/DC supply voltages. Frequently, mast-head-amplifiers attached to antennae must be supplied with AC/DC voltages via the coaxial line. The use of EMP-filters with λ/4 short-circuiting lines and such amplifiers is not possible in such a combination.

Known overvoltage suppressors filled with gas have the disadvantage that their use, due to their self-capacitance, is restricted to applications of typically <2.5 GHz.

It is object of the invention to create an EMP-charge-eliminator which permits a transmission of AC/DC supply-voltages which is applicable for multiple frequency bands and which is also applicable for very high frequencies (>2.5 GHz).

According to the invention this is made possible by the characteristics in the characterizing part of claim 1 which is characterized in that an overvoltage suppressor filled with gas is replaceably introduced between casing and λ/4 short circuiting line and that on the inside of the casing several bushes of different lengths and different diameters are arranged inside each other and in turn are connected to the overvoltage suppressor filled with gas. This circuit provides different resonance frequencies whereby transmission of an AC/DC supply voltages is possible, the EMP-charge-eliminator is applicable for several frequency bands and can be used up to very high frequencies.

Figure 2:
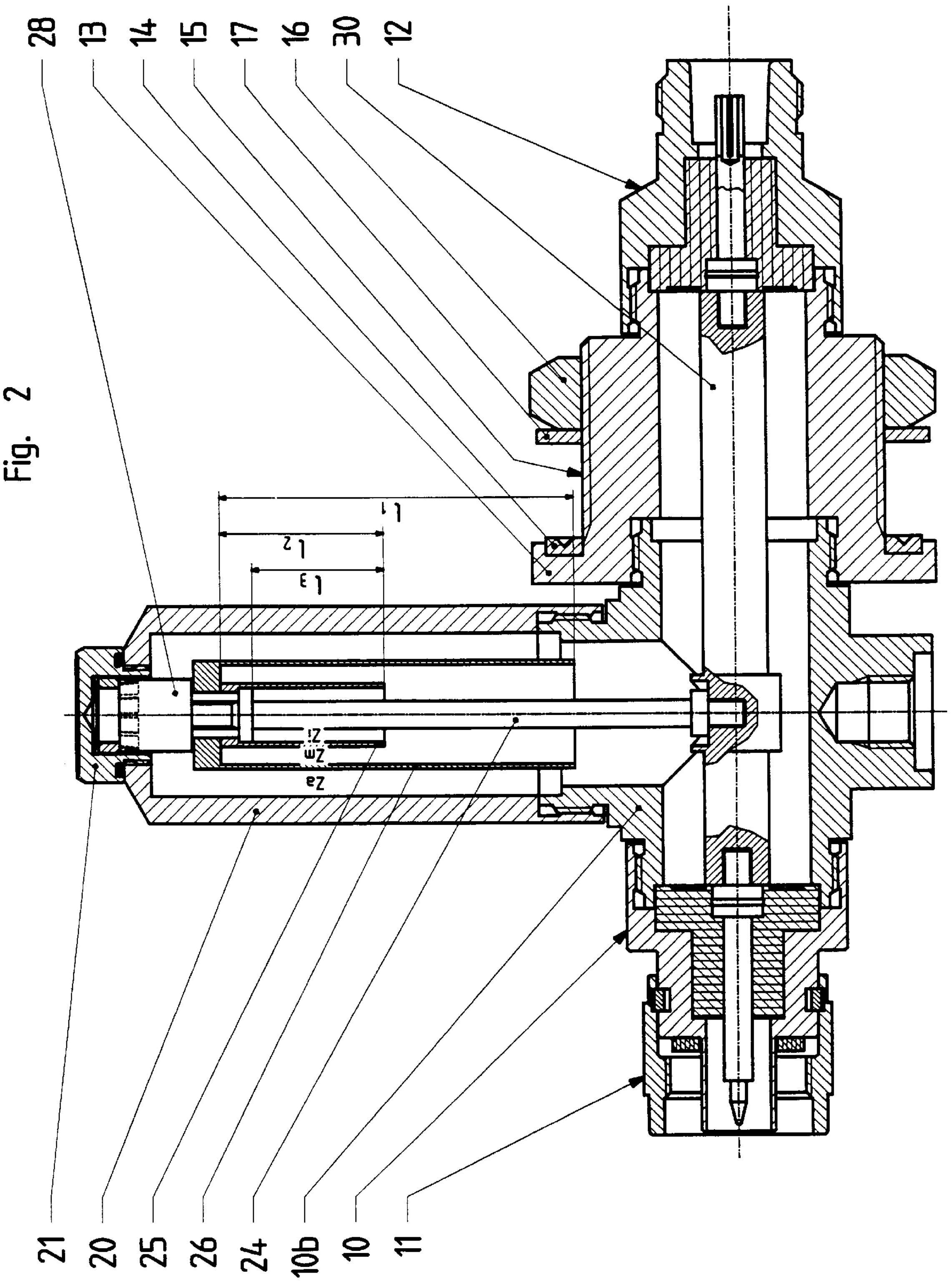

An example of an embodiment of the invention is explained in the following, whereby FIG. 1 shows an electrical schematic drawing of a multi-band-MP-charge-eliminator and FIG. 2 shows a sectional view of an inventive EMP-charge-eliminator.

The EMP-charge-eliminator according to FIG. 2 is designed as a plug-in-coupling. It consists of an outer line 10 which is designed as a cylindrical casing with connectors 11 and 12 arranged on both sides for threaded connections or plug-in connections of coaxial lines. Hereby, connector 11, on the left side in the drawing is intended as the connection to the non-protected area, e.g. to an antenna and connector 12, on the right side in the drawing, is intended to form the protected connection to an electronic apparatus. In the shown embodiment it is intended that the, EMP-Filter is fastened to a duct through the equipment casing which has an earth connection. For this purpose a flange 13 is provided on outer lie, 10 which, together with a washer 17 or something similar and a nut 16, form a threaded fastening to a wall of the equipment casing. An additional gasket 14 made of refined soft copper provides a low resistance and low inductance contact.

In a middle part 10*b* of outer line 10 a casing is screwed in or attached. The casing 20 is also called an outer hollow cylinder or an outer bush. This outer hollow cylinder 20 is provided with a threaded cover plate 21. An overvoltage suppressor 28 filled with gas is set in. This overvoltage suppressor 28 is designed to be replaceable and can be exchanged quickly and simply by opening cover plate 21. The length of line 24 is matched to the λ/4 wave length of the lowest frequency band to be transmitted. Overvoltage suppressor 28 makes contact between line 24 and the cover plate 21 and acts capacitively under normal condition. Due to this capacitance, line 24 between inner line 30 and overvoltage suppressor 28 thus acts as a λ/4 short circuit line at the lowest frequency band to be transmitted.

Several other hollow cylinders or bushes 25,26 are arranged on the inside of outer hollow cylinder 20 around line 24. On one end which faces towards the inner line 30 of the coaxial line these bushes 25,26 are open. On their other ends these bushes Z5,26 are connected to line 24 in an electrically conductive manner such that a serial circuit of resonant cavities is formed which, due, to their diameters, lengths and their distances from inner line 30 of the coaxial line can be matched to the chosen frequency bands and correspondingly to the chosen midband frequencies. In the shown embodiment example two other bushes are provided. The specialist with knowledge on the present invention is free to use, more than two further bushes of this kind. The individual frequency bands are dependant on each other and can be adjusted by tuning of the resonant circuits by changing the lengths and the diameters of the other bushes 25,26 correspondingly. In FIG. 2 the lengths $I_1$, $I_2$,$I_3$ are shown, which are the free lengths of the walls of the bushes 20,25,26 arranged inside each other which length are separated from each other by cavities. Length $I_1$ reaches from the fastening point of outer hollow cylinder 20 on line 24 up to the open end of the longest of the further bushes 25,26. In the present example of embodiment this is the outer of the other bush 26 (also called middle bush 26). Length $I_2$ is the length of the wall of the inner mast of the other bushes 25 (also called inner bush 25). The length $I_3$ reaches from the fastening point of middle bush 26 on line 24 up to the open end of inner bush 25. The length of the bushes 25,26 can be electrically shortened by means of dielectric material. The length of bushes 25,26 can also be shortened by means of resonant cavities with larger capacitances. For this purpose e.g. special end discs, cavity or cylinder capacitances can be used.

Hollow cylinders 20,25,26 and the capacitances of the gas filled overvoltage suppressor 28 are serially connected. With line 24, the capacitance of the gas-filled overvoltage suppressor 28 and the lengths of the hollow cylinders 25, 26 different frequency bands up to 18 GHz are transmitted. The outer hollow cylinder allows the transmission of a frequency band $f_1$, the middle hollow cylinder allows the transmission of a frequency band $f_2$ and the inner hollow cylinder 25 allows the transmission of a frequency band $f_3$. FIG. 1 shows that the electric effect of the mechanical resonant circuits determine the width of band of these frequency bands $f_1, f_2, f_3, \ldots$ . An outer impedance $Z_a$ corresponds with the outer hollow cylinder 20, a middle impedance $Z_m$ corresponds with the middle hollow cylinder 26, a inner impedance $Z_i$ corresponds with the inner hollow cylinder 25. Thus for example and according to the embodiment $f_1 =< f_2 =< f_3$, whereby $f_n = ½\pi x \sqrt{L_n x C_n}$, whereby n=1,2,3, . . . indicates the number of hollow cylinders or frequency bands. Thus different frequency bands can be transmitted and protected from harmful interference such that apparatuses of various sorts can be protected from EMP influences. The AC/DC-decoupling by means of the capacitance of the gas-filled overvoltage suppressor to the casing 20 specially allows an additional transmission of AC/DC supply voltages, e.g. to mast-head amplifiers attached, for example, to antennae.

We claim:

1. An EMP eliminator device for use with a coaxial line, the device comprising:

an equipment casing for electrically connecting the device to an outer line of the coaxial line;

a gas-filled overvoltage suppressor being operable at frequencies up to about 18 GHz; and a connection line electrically connected at one end to an inner line of the coaxial line and at another end electrically connected to the gas-filled overvoltage suppressor, wherein the connection line has a length which is tuned to a $\lambda/4$ wavelength of a lowest transmitted frequency band, the length of the connection line separates the gas-filled overvoltage suppressor from the inner line of the coaxial line, the overvoltage suppressor is replaceably set between the equipment casing and the connection line, the overvoltage suppressor transmits AC/DC voltages, on an inside portion of the equipment casing two bushes are connected in series to the overvoltage suppressor, and the bushes are arranged inside each other and have different lengths and different diameters which results in different resonant frequencies such that more than one frequency band may be transmitted through the device.

2. The EMP eliminator device according to claim 1, wherein the bushes form resonant cavities, and the lengths of the bushes are tuned to respectively produce different midband frequencies by adjusting the lengths.

3. The EMP eliminator device according to claim 2, wherein the bushes are arranged coaxially with respect to the connection line and are mechanically and electrically connected at respective ends distanced from the coaxial line.

4. The EMP eliminator device according to claim 3, wherein the diameters of the bushes are respectively tuned to bandwidths of frequencies to be transmitted.

5. The EMP eliminator device according to claim 4, wherein tuning of the frequencies is determined by an electrical contact point of the respective bushes to the connection line.

6. The EMP eliminator device according to claim 5, wherein the lengths of the bushes are electrically shortened by a dielectric material.

7. The EMP eliminator device according to claim 2, wherein a physical length of the bushes is shortened to form resonant cavities with a relatively higher capacitance than resonant cavities formed from longer bushes.

8. The EMP eliminator according to claim 7, wherein the relatively higher capacitance is produced by one of a cavity and a cylinder capacitor.

* * * * *